United States Patent Office 3,163,539
Patented Dec. 29, 1964

---

3,163,539
INSTANT TEA
William E. Barch, Stamford, Conn., assignor to Standard Brands Incorporated, New York, N.Y., a corporation of Delaware
No Drawing. Filed Sept. 7, 1961, Ser. No. 136,444
11 Claims. (Cl. 99—77)

This invention relates to tea concentrates and tea powders known as "instant tea," and to processes for preparing them. More particularly, the invention relates to novel processes for preparing tea extracts which may be concentrated or dried to obtain products which are readily soluble in cold water to produce a tea beverage.

One commercial method used heretofore to prepare instant tea involves making a hot water extract of tea leaves which is dried, either as such, or after it has been concentrated. Generally, the leaf tea blends used in this method include a significant proportion of black tea in order to obtain the flavor characteristics which are best suited to the American taste. Further, the extraction conditions are such that approximately from twenty-five to forty percent by weight of the solids in the leaf are dissolved. Products obtained in this manner from partially or fully fermented tea are largely insoluble in cold water and, therefore, are not suitable for the preparation of iced tea. The term "cold water" is used herein to designate cold tap water having a temperature of about 45 to 70° F. When such instant teas are mixed with cold water, the insoluble portions thereof give the beverage an undesirable turbid appearance. Furthermore, when such instant teas are dissolved in hot water and the resulting solutions are allowed to stand and cool to about 70° F. or lower, the solutions become turbid due to the formation of a precipitate. The cold-water insoluble portions of such instant teas are of a complicated and not fully characterized nature. They are highly colored and are comprised of polyhenols and polyhenyl quinones of various types, flavonal glycosides, and complexes of the polyphenols and flavonol glycosides with caffeine and the other purine alkaloids occurring in tea. Depending upon processing conditions and upon the particular blend of leaf teas employed, the instant tea produced in the above described manner may contain between 3% and 35% by weight of cold-water insoluble materials.

Heretofore attempts to improve the cold water solubility of instant tea have not been fully successful. A procedure commonly used to achieve this purpose involves cooling hot water extracts of leaf tea, prior to concentration or drying, to about 50 to 70° F., and separation of the insoluble portions precipitated at this temperature by filtration or contrifugation. The solid materials so removed are discarded and the clear filtrate or centrifugate is dried, either as such or after it has been concentrated. The efficiency of the separation may be improved by concentrating the extract before cooling so that it contains between five and fifteen percent solids and by reducing the viscosity of the concentrated extract before cooling by treatment with enzymes such as Pectinol 10M. The products obtained have fair to good cold-water solubility depending upon the efficiency of the solids removal process. However, the removal and discarding of cold-water insoluble constitutents entails a considerable loss of yield as well as of valuable flavoring and coloring constituents. Moreover, beverages made from these instant teas are chtaracterized by a very light, pale color, and lack the astringency and body which are typical of freshly brewed tea.

An object of the invention is a process of rendering soluble in cold water constituents extracted from tea leaves by hot water but which are not soluble in cold water and utilizing such solubilized constituents along with tea constituents normally soluble in cold water in the preparation of tea concentrates and instant tea having acceptable flavor, aroma and color.

A further object of the invention is the production of such tea concentrates and instant tea characterized further by solubility in cold water to yield a clear tea beverage having the aroma, flavor and color of iced tea made in the usual manner from freshly brewed tea.

Another object of the invention is an improved process of producing tea concentrates or instant tea whereby greater yields of constituents soluble in cold water are obtained from tea leaves than by processes heretofore known.

In general, in accordance with the invention, water extracts of tea leaf are prepared containing constituents insoluble in cold water as well as constituents soluble in cold water, and the constituents which are insoluble in cold water are rendered soluble in cold water by treatment in aqueous solution or slurry with sodium hydroxide, potassium hydroxide or ammonium hydroxide preferably in the presence of molecular oxygen. The resulting alkaline liquor is neutralized, the sodium, potassium, or ammonium ions are preferably removed from the solution and the solubilized solids therein are combined with cold water soluble tea constituents to produce a tea concentrate or instant tea.

The extract employed as starting material may be treated directly or it may be cooled to about 45–70% F. and the constituents precipitated at such temperatures may be separated from the extract and then treated in a water slurry in accordance with the invention. After solubilization they are recombined with extract from which they were separated.

The amount of alkali reacted with the extract or slurry should be sufficient, if added all at once, to raise the pH of the reaction mixture to at least about 8.5 and preferably about 10–11. This amount of alkali may be added to the extract or slurry in small amounts over a long period in which case the pH may never reach 8.5 and the desired reaction proceeds slowly. To save time all of the alkali is preferably added at once at the beginning of the reaction. The percentage of normally cold water insoluble constituents solubilized with the preferred amount of alkali is usually 80–100. The same result may be obtained with higher amounts of alkali but the use of such amounts is not recommended because it introduces excessive amounts of alkali metal and ammonium ions which must be removed.

While the treatment with alkali may be carried out at room temperature or below a relatively long time is required to obtain the desired result and it is therefore preferable to speed up the reaction by heating the alkaline liquor. For example, when an extract having a pH of 11 is treated at 75° F., from 2 to 3 hours are required to get the desired result whereas substantially the same result can be obtained in about 2.5 seconds when the same extract is treated at 250° F. Care should be exercised to avoid overheating, i.e., heating to excessive temperatures and heating too long at lower temperatures since this leads to products whose color is darker than is desirable. Excessive color development may take place if the pH, temperature, heating time and oxygen concentration are not properly controlled. Treatment at temperatures considerably above 250° F. is not recommended.

During the solubilization reaction the pH of the extract or slurry will drop slowly. The treatment should preferably be continued until the drop in pH amounts to about one unit and until at least a major portion and preferably all of the solids not soluble in cold water have been solubilized. Of course, a smaller but useful degree of solubilization may be attained by a shorter treatment. The extent of solubilization can be determined by comparing the amount of such solids present originally in the extract or slurry to be treated with the amount precipitated when the solubilized liquor is cooled to about 70° F. and mixed with enough acid to reduce its pH to the level before the alkali was added.

Oxygen appears to play an important role along with the alkali in the solubilization reaction of this invention. Ordinarily, when tea leaf is extracted with water, the extract obtained contains some dissolved or entrained oxygen (air). This oxygen, together with oxygen compounds derived from tea normally present in such extracts, which act as oxidizing agents, appear to be sufficient to bring about the solubilization of the major portion of the cold water insoluble solids. Even in the absence of such dissolved or entrained oxygen, the oxygen compounds present in the extract are capable of bringing about considerable solubilization at room temperature and higher. The solubilization can be increased if desired by introducing air or oxygen into the extract but the amount of such air or oxygen should preferably be limited to prevent undue darkening of the color of the extract. This would lead to a very dark finished product which may not be desired by some consumers.

When tea extract solids not soluble in cold water are treated with alkali in accordance with the invention in a water slurry apart from the constituents soluble in cold water, the air normally dissolved or entrained in the water and the oxidizing agents normally present in such solids, do not appear to be sufficient to solubilize the major portion of the insoluble constituents and must be supplemented by additional molecular oxygen. Here again, the amount of the oxygen should preferably be limited to prevent formation of dark colored compounds.

At the end of the alkaline treatment the solutuion may have a darker color than is desirable and it will have a higher pH than that of the original tea extract. This product will not yield an acceptable tea beverage because its taste is too alkaline. Therefore, to obtain satisfactory flavor quality, it is advisable to reduce the pH substantially and preferably to about its original level, i.e., within the range of about 4.7 to 5.5. This may be accomplished by adding a neutralizing agent, for instance an edible acid such as acetic, sulphuric and phosphoric acids, or ion exchange resins in the hydrogen form, for example resins of the type sold under the trade names "Amberlite IRC–50," "Amberlite IR–120" and "Dowex 50–X8." Lowering the pH also causes a lightening of the color of the solution.

It is preferable to use the resins since they neutralize the solution and when separated from the solution remove from it the alkali metal or ammonium ions introduced during the solubilization period. When the desired pH is reached, the resin is separated from the liquid. This resin will contain some entrained tea solids, which it is desirable to recover. This may be accomplished by simply washing the spent resin with cold or hot water. In some instances, a stronger treatment may be required to remove all of the entrained tea solids. In such instances, the spent resin may be mixed with an aqueous solution of sodium hydroxide, potassium hydroxide or ammonium hydroxide. After stirring, the resin is separated from the alkaline liquid which may then be added to subsequent batches of tea extracts prior to solubilizing them in the manner described above. If desired, the reduction in the pH of the alkaline solution may be accomplished by adding to it dry tea solids obtained in carrying out the process of the invention. Generally, the dry tea solids used for this purpose will have the desired finished product qualities except that they will not have the bulk density and/or particle size distribution most desired for a commercial product.

After reduction of the pH of the solution obtained at the end of the solubilization reaction, the solution should be clarified by cooling to a temperature within the range of approximately 50 to 80° F. and filtering or centrifuging to remove any precipitated materials which are insoluble at such temperature. Prior to such clarification, it is generally preferable to concentrate the solution to the degree at which the most efficient separation of the solids can be obtained. Centrifugation appears to be most efficient when the feed contains about 10 to 15% solids by weight. The amount of insoluble material so obtained will depend on the efficiency of the solubilization reaction and the temperature at which the solution is filtered or centrifuged and will range usually from a negligible amount up to about 15% of the weight of the tea solids present in the solution prior to clarification. This insoluble material may be discarded or it may be slurried in water and subjected again to the solubilization process.

The clarified solution is then concentrated or dried to obtain the finished product of this invention. If desired, aroma and flavor distillate obtained from tea leaves or water extracts of tea leaves may be added to the clarified solution before it is concentrated or dried. Concentration and drying may be carried out by methods well known in the art.

In the foregoing, I have indicated that instead of treating the tea extract constituting the starting material, it may be desirable to separate therefrom the cold water insolule constituents and subject them to the solubilization reaction in a water slurry apart from the cold water soluble constituents. This procedure reduces significantly the volume of material subjected to the solubilization reaction and may permit simpler and more accurate control of the reaction. The solids content of the slurry may range from a few percent to about 12–15% and is preferably about 10%. At higher concentrations the slurry may have a tendency to gel during the solubilization reaction and this should be avoided because the viscosity of the slurry is increased to the point that it is difficult to handle it. The reaction is preferably carried out at atmospheric pressure and at a temperature within the range of about 110 to 160° F.

The optimum amount of oxygen to be introduced into the slurry is that amount which will bring about complete solubilization. This amount will vary depending upon the composition of the cold water insoluble tea constituents in the slurry or extract being treated. Occasionally less than the optimum amount of oxygen must be used to arrive at the desired color depth and shade.

When cold water insoluble tea constituents are solubilized apart from cold water soluble tea constituents, these constituents are eventually combined again to produce the final tea concentrate or instant tea. This recombination may be brought about, for instance, by mixing the solution containing the solubilized constituents before or after adjustment of its pH, with (1) the extract employed as starting material, containing both cold water soluble and cold water insoluble tea constituents, (2) tea extract from which the cold water insoluble constituents have been separated, or (3) after dilution with water it may be mixed with dry tea leaf. If the resulting solution does not have the desired pH, the pH is adjusted with an acidic material. Also, any tea leaf and cold water insoluble tea constituents in the solution are removed and the latter may be solubilized by the process herein disclosed. The final solution, containing the normally cold water soluble tea constituents, the solubilized tea constituents, having a pH of about 4.7 to 5.5, and substantially free of cold water insoluble materials is then concentrated or dried to produce the final product of this invention.

The tea extracts used as starting material in the present invention may be made by any of the extraction procedures known in the art. As is common in the art, it is preferable to first strip the tea or tea extract of volatile flavor and aroma constituents. This may be accomplished by any of the methods known in the art.

A particularly advantageous way of simultaneously preparing a water extract of tea and a distillate containing the volatile flavor and aroma fractions, is described in Example 1 hereinafter. The water extract obtained by this method may have a "cooked" or bitter off flavor. Such off flavors may also result if tea extracts are prepared at excessively high temperatures or the tea solids are heated for too long a period. It has been found that the process of the present invention is particularly useful in the treatment of such extracts in that it serves to eliminate such "cooked" and bitter off flavors as well as to solubilize the tea solids which are not soluble in cold water.

In order more clearly to disclose the nature of the present invention, specific examples will hereinafter be described. It should be understood, however, that this is done solely by way of example and is intended neither to delineate the scope of the invention nor limit the ambit of the appended claims. In the examples and throughout this specification percentages are intended to refer to percent by weight, unless otherwise specified.

*Example 1*

This example illustrates the simultaneous preparation of an aqueous extract and an aroma and flavor distillate.

The still of a distilling apparatus was charged with 200 grams of fresh black tea leaf and 2000 ml. of fresh water. The mixture was kept at boiling temperature for about 2½ hours while subject to slow agitation. The volatilized portion was passed through a Schneider rectifying column and through a condenser cooled with water at 0–5° C. The distillate amounting to about 26 ml. and composed of water and the volatile flavor and aroma fraction of the tea was frozen and held for future use. The still contents was passed under vacuum through a No. 200 U.S. Standard screen to separate the extracted leaf from the tea extract.

*Example 2*

This example illustrates the treatment of tea extract in accordance with the invention in the absence of dissolved or entrained oxygen.

Seven hundred milliliters of tea extract were obtained by percolating water at a temperature of 200° F. continuously over a quantity of fresh black tea leaf. This extract had a pH of 4.9 and contained 9.37% solids, equal to 65.48 grams of dissolved tea solids, about 21% of which was insoluble in water at room temperature. The extract was cooled to room temperature, and 144 milliliters of an aqueous 10% solution of KOH were slowly stirred into the extract to raise the pH to 11.0. Nitrogen gas was slowly bubbled through the extract for 15 minutes to remove any oxygen that might have been entrained in the extract. The alkaline liquor was then stored at room temperature for 72 hours in a nitrogen atmosphere and then 72.5 grams of Aberlite IR–120 ion exchange resin were slowly stirred in, thereby lowering the pH to 4.9 The liquid was decanted from the resin and the resin was washed with 225 milliliters of water at room temperature. The wash water was added to the decanted liquid and the mixture was centrifuged at 3500 r.p.m. The centrifugate was dried in vacuo at 149° F. The residue, when dried in vacuo at 149° F., weighed 4.77 grams. From this finding, it was determined that the degree of solubilization obtained was about 65%. 0.5 gram of the dried centrifugate was added to 150 milliliters of water at a temperature of 60° F. It dissolved completely to give a clear solution, the color of which was slightly lighter than generally preferred.

*Example 3*

This example illustrates the treatment of tea extract containing dissolved or entrained oxygen in accordance with the invention.

Sufficient fresh black tea was extracted in a conventional manner by continuously percolating hot water at 200° F. over the fresh tea leaf, to yield 116 pounds of extract. This extract was diluted to about 5 percent tea solids by the addition of 16 pounds of fresh water. The diluted extract having a pH of 4.92 was cooled to room temperature, i.e., about 75–85° F., and 915 ml. of 45% aqueous KOH solution was slowly stirred into it thereby raising its pH to 11.0.

This alkaline liquor containing dissolved or entrained air was then pumped through a thin tubed heat exchanger where it was heated to 250° F., and maintained at this temperature for about 2.5 seconds. From the heat exchanger, the liquid was introduced into a flash cooler maintained under a vacuum of 28 inches mercury, wherein its temperature was quickly reduced to 110° F. The cooled liquor was passed through a column, 3 inches wide and 6 feet high, packed with Amberlite IRC–50 cation exchange resin. Upon discharge from the column, the pH of the liquor was 4.88. The liquor was then cooled to 75° F. and centrifuged. The small amount of separated cold water insoluble solids was discarded. The clear centrifugate was first concentrated and then dried in a drum drier to form an instant tea powder.

The dried powder dissolved readily in water at 44° F., giving a clear solution having the desired tea beverage color. A more acceptable instant tea can be made by incorporating tea aroma and flavor distillate in the centrifugate before drying.

*Example 4*

This example illustrates the solubilization in accordance with the invention of cold water insoluble tea constituents apart from cold water soluble tea constituents.

4400 ml. of a tea extract having a dissolved solids concentration of 10% by weight was obtained by extracting fresh black tea leaf with water at 200° F. The extract was chilled to 70° F. and centrifuged to yield a wet residue of cold water insoluble tea solids weighing 90 grams. This residue was suspended in 300 ml. of water to give a suspension having a pH of 4.8. The pH of the suspension was adjusted to 10.0 by the addition of 76.7 ml. of an aqueous 10% solution of KOH. This suspension was then aerated at a high speed for 30 minutes in a Waring Blendor, at the end of which time the pH of the suspension was 8.8, and its temperature was 110° F. The pH of the suspension was adjusted to 4.8 by adding 29.3 grams of Amberlite IR–120 cation exchange resin. The resin was separated from the liquid which was then combined with the centrifugate obtained above and the mixture was cooled to 70° F. and centrifuged. The centrifugate was concentrated and spray dried. The dried product dissolved readily in cold tap water yielding a clear tea beverage.

*Example 5*

This example illustrates the solubilization in accordance with the invention of cold water insoluble tea constituents apart from cold water soluble tea constituents, wherein the solubilized solids are recycled into the process by combining them with untreated tea extract.

Cold water insoluble tea constituents were solubilized as described in Example 4 and, before treatment with resin the resulting solution was mixed with untreated tea extract containing 10% solids, in such proportion that the weight of the solids in said solution was equal to the weight of the cold water insoluble solids in the extract. The pH of the mixture was adjusted to 4.8 by the addition of Amberlite IR–120 cation exchange resin. The resin was removed from the liquid which was then cooled to 70° F. and centrifuged. The weight of the separated insoluble materials was approximately equal to the weight of cold water insoluble solids present in the untreated extract. The centrifugate was concentrated and spray dried. The dried product dissolved readily in cold tap water yielding a clear tea beverage having an excellent tea color.

Example 6

This example illustrates the treatment of a bitter tea extract in accordance with the invention to eliminate the bitter flavor and solubilize the cold water insoluble tea constituents.

An aqueous extract obtained as described in Example 1 having an undesriable bitter flavor, was concentrated to 5.0% solids in a Rodney-Hunt falling film evaporator under a vacuum of 27 inches of mercury. This extract was cooled to 75° F. and a 45% aqueous solution of potassium hydroxide was added to raise its pH to 10.0. A blanket of nitrogen was maintained over the mixture while the potassium hydroxide was added and throughout all subsequent operations until the extract was brought back to its original pH of 4.8. The mixture was held at room temperature for 1 hour and then at 220° F. for about 2.5 seconds, whereupon it was immediately flash cooled to 130° F. The cooled liquid had a pH of 9.54. It was chilled immediately to 75° F. under a blanket of nitrogen and Dowex 50X-8 cation exchange resin was added to adjust its pH to 4.8. The resin was separated from the liquid which was then concentrated to 10.3% solids in a Rodney-Hunt falling film evaporator under a vacuum of 27 inches of mercury. The concentrate was chilled to 70° F. and centrifuged. The separated insoluble solids, representing about 17% of the total solids of the original extract, were suspended in water to produce a slurry having 10% solids. A sufficient amount of 45% aqueous potassium hydroxide was added to this slurry to raise its pH to 11.05. The mixture was aerated at high speed for 30 minutes in a Waring Blendor, at the end of which time the pH if the solution was about 9.22 and its temperature was about 110° F. This solution was cooled to 70° F. and its pH was adjusted to 4.8 with Dowex 50X-8 cation exchange resin. The resin was separated from the liquid which was then combined with the centrifugate described above and the mixture was concentrated to about 54.8% solids in a Rodney-Hunt falling film evaporator at a vacuum of 27 inches of mercury. The concentrated solution was mixed with an aroma and flavor distillate obtained as described in Example 1 and the resulting mixture was freeze dried. The dried product was readily soluble in cold tap water to produce a clear solution having excellent tea color, flavor and aroma, and was free of bitter flavor.

The term "water dispersion" in the appended claims is intended to include mixtures of water and solids whether the solids are in solution or in suspension or both.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

What is claimed is:

1. A method of rendering soluble in cold water constituents of tea leaf which are normally insoluble in cold water but soluble in hot water which comprises reacting a water dispersion thereof apart from the tea leaf with an alkali of the class consisting of sodium hydroxide, potassium hydroxide, and ammonium hydroxide at a temperature and for a time sufficient to solubilize the said tea constituents so that at least a portion thereof remains in solution when the pH of the dispersion is reduced to about 5.0 and the dispersion is cooled to 50° F., the amount of said alkali being equal to the amount required to raise the pH of the dispersion employed as starting material to at least about 8.5, and adding sufficient edible acidic material to the dispersion, to reduce its pH to about 4.0 to 7.0.

2. A method as defined in claim 1 wherein the water dispersion is one obtained by extracting tea with hot water.

3. A method as defined in claim 1 wherein the water dispersion is obtained by extracting tea leaves with hot water separating the extract from the tea leaves, cooling the extract to a temperature of about 45 to 70° F., separating the precipitated solids from the liquid and dispersing the solids in water.

4. A method as defined in claim 1 wherein the amount of alkali is sufficient to raise the pH of the dispersion to about 10 to 11.

5. A method as defined in claim 1 wherein the pH reduction is effected by means of an ion exchange resin in the hydrogen form and the resin is then separated from the dispersion.

6. A method of rendering soluble in cold water constituents of tea leaf which are normally insoluble in cold water but soluble in hot water which comprises reacting a water dispersion thereof apart from the tea leaf with oxygen and an alkali of the class consisting of sodium hydroxide, potassium hydroxide, and ammonium hydroxide at a temperature and for a time sufficient to solubilize the said tea constituents so that at least a portion thereof remains in solution when the pH of the dispersion is reduced to about 5.0 and the dispersion is cooled to 50° F., the amount of said alkali being equal to the amount required to raise the pH of the dispersion employed as starting material to at least about 8.5, and adding sufficient edible acidic material to the dispersion, to reduce its pH to about 4.0 to 7.0.

7. A method as defined in claim 6 wherein the amount of alkali is sufficient to raise the pH of the dispersion to about 10 to 11.

8. A method as defined in claim 7 wherein all of the alkali is added at the beginning of the reaction.

9. A method as defined in claim 1 wherein the alkali reaction is continued until the pH of the dispersion drops by about one unit and at least a major portion of the solids not soluble in cold water have been rendered soluble in cold water.

10. A method as defined in claim 1 wherein the alkali treatment is carried out at a temperature from about room temperature to about 250° F.

11. A method of preparing instant tea which comprises extracting tea leaves with hot water separating the extract from the tea leaves, concentrating the extract, cooling the concentrated extract to a temperature of about 45° F. to 70° F., separating precipitated solids from the liquid containing cold water soluble tea constituents, dispersing the solids in water, reacting the dispersion with oxygen and an alkali of the class consisting of sodium hydroxide, potassium hydroxide, and ammonium hydroxide at a temperature between about 110° F. and about 160° F. for a time sufficient to render at least a major portion of the tea constituents in the dispersion soluble in cold water, the amount of said alkali being equal to the amount required to raise the pH of the dispersion employed as starting material to about 10 to 11, mixing the resulting liquid and the said liquid containing the original cold water solble tea constituents, adding sufficient edible acidic material to the mixture to adjust its pH to about 5.0, cooling the mixture to a temperature within the range of about 50° F. to 80° F., separating liquid and precipitated solids and drying the liquid.

References Cited in the file of this patent

UNITED STATES PATENTS

| | | |
|---|---|---|
| 2,831,772 | Herz | Apr. 22, 1958 |
| 2,852,388 | Cortez | Sept. 16, 1958 |

FOREIGN PATENTS

| | | |
|---|---|---|
| 403,868 | Great Britain | Jan. 4, 1934 |

UNITED STATES PATENT OFFICE
CERTIFICATE OF CORRECTION

Patent No. 3,163,539　　　　　　　　　　　　December 29, 1964

William E. Barch

It is hereby certified that error appears in the above numbered patent requiring correction and that the said Letters Patent should read as corrected below.

Column 1, line 38, for "polyhenols and polyhenyl" read -- polyphenols and polyphenyl --; line 51, for "contrifugation" read -- centrifugation --; line 62, for "constitutents" read -- constituents --; column 3, line 35, for "solutuion" read -- solution --; column 4, line 27, for "insolule" read -- insoluble --; column 5, line 56, for "Aberlite" read -- Amberlite --; column 7, line 7, for "undesriable" read -- undersirable --; line 32, for "if" read -- of --; column 8, line 60, for "solble" read -- soluble --.

Signed and sealed this 15th day of June 1965.

(SEAL)
Attest:

ERNEST W. SWIDER
Attesting Officer

EDWARD J. BRENNER
Commissioner of Patents